(12) United States Patent
Tedenstig

(10) Patent No.: US 6,307,859 B1
(45) Date of Patent: Oct. 23, 2001

(54) DEVICE AND METHOD RELATED TO TELECOMMUNICATION NETWORKS

(75) Inventor: Ove Tedenstig, Märsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/993,240

(22) Filed: Dec. 18, 1997

(30) Foreign Application Priority Data

Dec. 20, 1996 (SE) .................................................. 9604708

(51) Int. Cl.⁷ .................................................. H04L 12/56
(52) U.S. Cl. .......................... 370/401; 370/404; 370/395
(58) Field of Search .................................. 370/378, 404, 370/458, 459, 460, 498, 522, 375, 376, 377, 381, 384, 386, 388, 392, 395, 401, 405–406, 452, 403, 412, 413–419, 465, 551, 352; 375/242

(56) References Cited

U.S. PATENT DOCUMENTS

| | | |
|---|---|---|
| 3,731,002 | 5/1973 | Pierce . |
| 3,749,845 * | 7/1973 | Fraser ...................................... 179/15 |
| 3,925,621 * | 12/1975 | Collins et al. ........................... 179/15 |
| 4,558,444 * | 12/1985 | Kenedy et al. ........................... 370/58 |
| 4,587,651 * | 5/1986 | Nelson et al. ........................... 370/88 |
| 4,768,190 * | 8/1988 | Giancarlo ............................... 370/86 |
| 5,319,486 | 6/1994 | Vogel et al. . |
| 5,327,427 | 7/1994 | Sandesara . |
| 5,412,655 | 5/1995 | Yamada et al. . |
| 5,414,819 | 5/1995 | Redmond et al. . |
| 5,455,820 | 10/1995 | Yamada . |
| 5,495,484 | 2/1996 | Hughes-Hartogs . |
| 5,862,136 * | 1/1999 | Irwin .................................... 370/395 |
| 6,038,226 * | 3/2000 | Ellersick et al. ...................... 370/352 |

FOREIGN PATENT DOCUMENTS

| | | |
|---|---|---|
| 0 526 717 A2 | 2/1993 | (EP) . |
| WO 94/00960 | 1/1994 | (WO) . |

* cited by examiner

Primary Examiner—Dang Ton
Assistant Examiner—Toan Nguyen
(74) Attorney, Agent, or Firm—Burns, Doane, Swecker & Mathis, L.L.P.

(57) ABSTRACT

The present invention relates to a connection device, an exchange unit comprising such devices as well as methods of connecting signals within an exchange unit. The exchange unit comprises a connection device (61) having a message writing device (66), which adds, for each traffic channel received in a time slot in consecutive frames that are transmitted on a telecommunication line (PCM2), an address to a payload comprising at least a part of one signal received in said channel in order to form a message. The address points out a message reading device (68) and the message writing device sends the message to this message reading device for sending in some time slot in consecutive frames transmitted on a second, outbound telecommunication line (PCM3). The exchange unit also comprises a routing device (60) for each connection device, which together form a node in a hierarchiacal transport net-work comprising ring shaped highspeed links. A message writing device then sends messages to a message reading device via a routing device and possibly via other routing devices and bridges in the transport network.

23 Claims, 6 Drawing Sheets

DEVICE AND METHOD RELATED TO TELECOMMUNICATION NETWORKS

TECHNICAL FIELD

The present invention relates to the field of telecommunication and particularly to a device and method in telecommunication networks or a connection device, an exchange unit comprising at least one such connection device, and methods for sending, receiving and switching signals within an exchange unit. Such an exchange unit can, for instance, be a telephone exchange for switching digital information.

PRIOR ART

Transport of data and information mostly occurs in some kind of serial transmission, where the information flow is arranged in time according to a standard stipulated sequence pattern. Examples of this are transmission of the TV-signal to a television set, digital PCM-transmission (Pulse Code Modulation) of data and telephony, transmission of speech and data via the radio signal to a GSM-phone etc. A particular such sequence pattern for telecommunication is division of the information flow into successive frames, where each frame comprises a set number of time slots, and one channel or connection between two communicating units takes up one time slot in several successive frames. Signals in such a channel may in these cases comprise video image information, speech information, pure data information or control information.

Pure data transmission can often occur using HDLC-packages (High Level Data Link Control). Such a package comprises data and an address, and the package is sent from one computer to another over any network using the address. Such data packages are used in pure computer networks, i.e. where several computers are interconnected. Such networks usually have a bus or ring structure. Such an HDLC-package can also be transmitted over an ordinary telecommunication network, where the ordinary telecommunication network transfers information over, for in-stance, PCM-lines in the previously mentioned time slots. An HDLC-package is then divided and transferred in one or several time slots in any successive frames over the telecommunication line according to any particular protocol and is coupled through an exchange unit in the shape of time slots, i.e. the whole package is not switched through the exchange at the same time.

Another transfer system is ATM (Asynchronous Transfer Mode), where data and telephony is transferred in the form of cells of a fixed size. An ATM-cell comprises 53 bytes of block information, where 48 bytes are data or telephony and the remaining 5 bytes comprises address and control information. Different ways exist for interconnecting telecommunication lines of PCM-type with exchanges through which speech and data in cells are transported. In an ATM-exchange a queue can form when simultaneous incoming information from different directions is to go out the same way through the switching core in such an exchange. Such forming of a queue can cause inpredictable delay and lost information.

U.S. Pat. No. 5,412,655 discloses a system switching TDM-channels (Time Division Multiplex) through an ATM-exchange. In this system a frame is received comprising a number of time slots, where each time slot can comprise a TDM-channel. Information transferred in the channels is stored in a corresponding buffer, i.e. there is one buffer per TDM-channel. When such a buffer has been filled, its content is sent through the exchange as an ATM-cell and one cell per connection is thus used.

U.S. Pat. No. 5,495,484 discloses an ATM-network interconnected using a bidirectional optical loop.

U.S. Pat. No. 5,414,819 discloses a network for interconnecting a processing element and which comprises an optical connection.

U.S. Pat. No. 5,327,427 discloses a logical hybrid ring device comprising two loops interconnected using two cross-connection nodes.

U.S. Pat. No. 5,319,486 discloses a node comprising address reading means for received packages. Since the information transferred in the above mentioned frame-divided transfer structure can vary in dependence of which type of information is being transferred, where the information can be data, compressed speech, pure speech or video, the information in one channel takes up parts of the structure of different sizes. It can fill one time slot, several time slots or only a part of a time slot. It is therefore of interest to provide an exchange unit which can handle these varying flows in an efficient way. The problem with ATM-exchanges in this context, i.e. when used in connection with PCM-links, is that it is difficult to use the ATM-structure efficiently. In efficient use of the ATM-structure, a cell used for transfer of one channel is filled completely. This is no problem when the channel used is large, i.e. uses more than one time slot, which can be the case in data transmission, but when the channel is small, i.e. only takes up one or part of one time slot and is used for transfer of telephony, long and unacceptable delays arise in an ATM-exchange. The other extreme of only filling the cell with the contents of one channel from one frame, normally only one time slot, means a considerably faster exchange but inefficient use of the cells. Such switching of many cells through the ATM-exchange can cause problems with great delays due to buffering. This structure is not flexible and adaptive to different conditions such as channels taking up less than one time slot per frame, either.

DESCRIPTION OF THE INVENTION

The present invention addresses a problem of providing an efficient way of fast switching of signals through an exchange unit when it is to be possible to use this exchange unit flexibly for different applications, such as transmission of speech and data, while a constant delay through the exchange unit is guaranteed.

Another problem solved by the present invention is to provide a signal structure for sending through an exchange unit which is simple and easily adaptable to different user requirements, such as long or short delay of signals switched through the exchange unit.

An object of the present invention is thus to provide an efficient way of switching signals through an exchange unit while avoiding long switching delays.

A further object of the invention is to provide a signal transport and handling of signals switched through the exchange unit.

One more object is to provide an exchange unit with high capacity of signal switching.

This is achieved by adding, to at least a part of a signal in a traffic channel received on a first telecommunication line, said traffic channel filling one, a part of one or more than one time slot in several consecutive frames, an address at least partly pointing to the time slot/s in the frame/s in which a part of the signal/s is going to be sent.

This problem is thus solved by a connection device, an exchange unit comprising such a connection device, and a method for sending signals within the exchange unit, said connection device comprising at least one input buffer for receiving and storing at least one frame of traffic incoming to the exchange unit, where signals are transmitted in traffic channels in time slots, a message writing device connected to the input buffer and a descriptor write unit connected to the message writing device. The descriptor write unit comprises descriptors established in advance for signals received in the input buffer, each descriptor comprising an address. The message writing device adds, for each traffic channel, an address from the first descriptor write unit to a pay-load comprising at least a part of one or a limited number of signals received in the traffic channel for forming a message, said address pointing to a corresponding message reading device and, at least indirectly, at least one time slot or a part of a time slot in at least one frame in which the pay-load is to be sent from the exchange unit, and sends the message to the message reading device. The length of the messages can be varied.

The problem is also solved by a connection device, an exchange unit comprising such a connection device and a method for receiving signals within the exchange unit, said connection device comprising at least one output buffer for storing signals to be sent in at least one frame and a message reading device connected to the output buffer. The message reading device receives at least one message from a message writing device, said message comprising an address pointing to the message reading device and a pay-load comprising at least a part of one or a limited number of signals for sending in a traffic channel in one or several consecutive frames to leave the exchange unit. The message reading device stores the pay-load in at least one, at least indirectly determined by the address, position in the output buffer for sending in a traffic channel in at least one time slot or a part of a time slot in at least one frame. The length of the messages can be varied.

The problem is also solved by a method for switching signals in an exchange unit, comprising generating at least one message, each message having a pay-load and an address comprising a transport network address. At least one of the messages has a local address comprised in the address and a pay-load comprising at least a part of or a limited number of signals received in a traffic channel filling a certain, a part of a certain or more than a certain time slot in several consecutive frames received on a first telecommunication line connected to the exchange unit. The method also comprises the steps of connecting, in a first routing device, the message to a transport network if the message has a transport network address, differing from an address assigned to the first routing device, receiving, in a second routing device, the message from the transport network, retransmitting the message if the transport network address differs from an address assigned to the second routing device, otherwise keeping the message in the routing device and retransmitting the message, if it has a local address, to a message reading device determined by the local address and sending the pay-load in one or several consecutive frames on a second, from the exchange unit outgoing telecommunication line.

The present invention has several advantages, as it is modularly built and an exchange unit according to the invention easily can be extended without substantial change to the structure.

The message structure can be altered and this enables simple adaption of an exchange unit to different sorts of traffic and traffic requirements.

The address structure according to the invention is so simple that most of the control of the messages through the exchange unit can be made by reading and control in hardware. This provides a simple and fast exchange unit and simplified control of the message flow.

The term "signal" is essentially taken to mean all the information that is transferred in a traffic channel in a frame. A speech sample in a time slot is thus taken to be a signal. The invention will now be further described using preferred embodiments and with reference to the annexed drawings.

PREFERRED EMBODIMENTS

Figure 1:
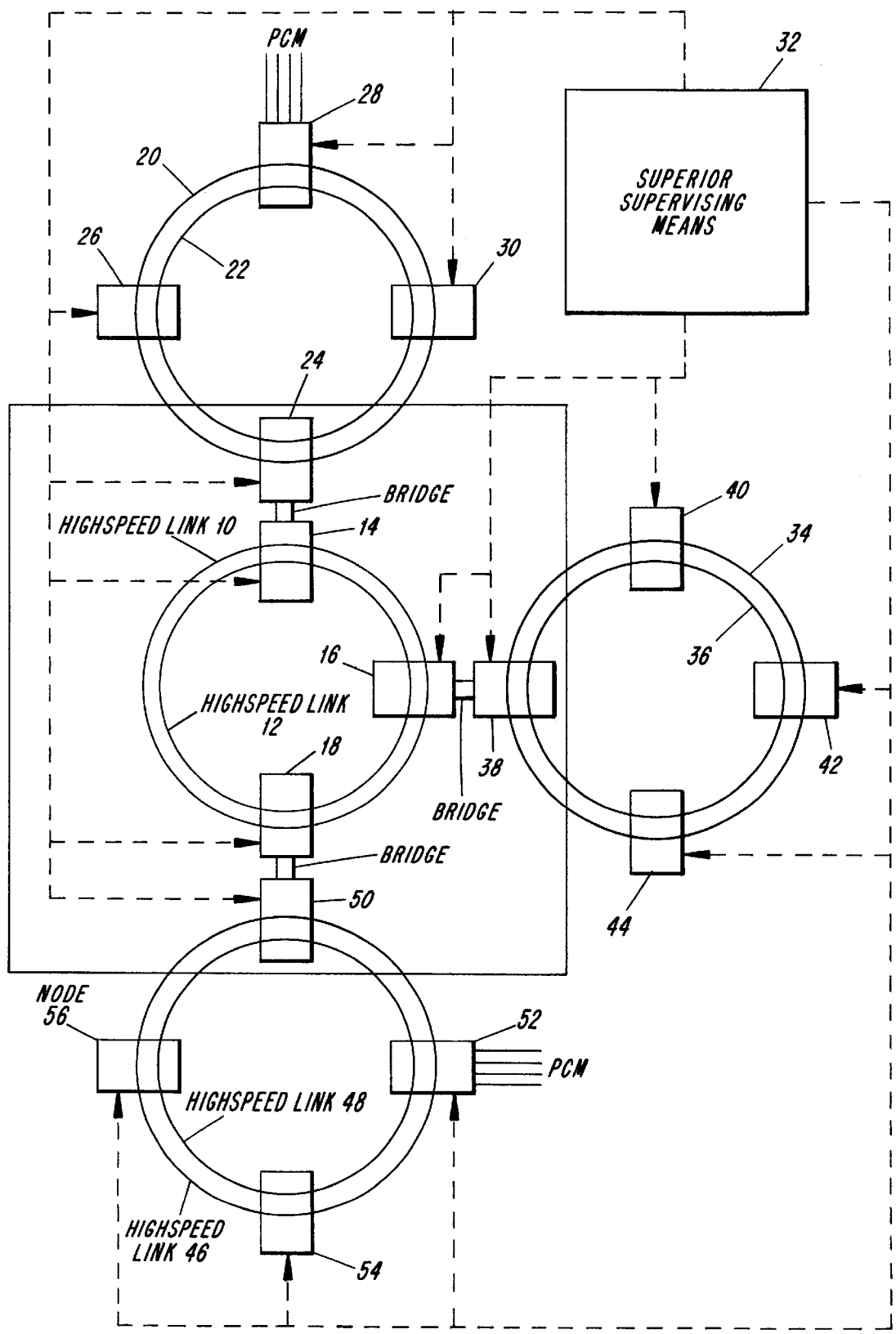
FIG. 1 schematically shows an exchange unit according to the invention.

In FIG. 1 an exchange unit according to the invention is shown. The exchange unit comprises a first central high speed link 10 in the shape of an optical fibre. A second central highspeed link 12 is associated with the first central highspeed link 10. In the first central highspeed link 10 a first, second and third node 14,16 and 18 are arranged for adding and removing traffic from the first central highspeed link. A first peripheral highspeed link 20 with an associated second peripheral highspeed link 22, is connected to the first central highspeed link 10 by a fourth node 24. Here the fourth node 24 is connected to the first node 14 to form a first bridge for transfer of traffic between these two highspeed links. The first peripheral highspeed link 20 comprises a fifth, sixth and seventh node 26, 28 and 30. To the fifth, sixth and seventh node 26, 28 and 30, to the exchange unit incoming and outgoing telecommunication lines are connected, but only parts of four PCM telecommunication lines (Pulse Code Modulation) connected to the sixth node 28 are shown. A third and fourth peripheral highspeed link 34, 36 are connected in the same way as the first and second peripheral highspeed links 20, 22 to the central highspeed link 10. The third highspeed link 34 comprises an eighth, ninth, tenth and eleventh node, 38, 40, 42 and 44, where the eighth node 38 is connected to second node 16 in the central highspeed link to form a second bridge for feeding and fetching traffic to and from the first central highspeed link 10. The ninth, tenth and eleventh nodes 40, 42, 44 all have PCM-links connected (not shown). A fifth and sixth peripheral highspeed link 46,48 and comprising a twelfth, thirteenth, fourteenth and fifteenth node (50, 52, 54 and 56)

are connected to the first central highspeed link 10. Hereby the twelfth node 50 together with the third node 18 form a third bridge between these two highspeed links. The thirteenth, fourteenth and fifteenth nodes 52, 54 and 56 have PCM-links connected, but only part of a number of PCM-telecommunication lines connected to the thirteenth 52 are shown. The two central highspeed links 10 and 12, together with the first, second, third, fourth, eighth and twelfth nodes 14,16,18, 24, 38 and 50, i.e. the nodes forming the bridges, are preferably comprised on a common circuit board and all other nodes are arranged, each in a respective switching device, where a switching device preferably is arranged on its own circuit board. In this way, a modularly extendable exchange unit is provided.

FIG. 1 also comprises a superior supervising means 32 for controlling the exchange unit. This supervising means controls all nodes for establishing telecommunication connections through the exchange unit and supervises the functions of the exchange unit. Information is transferred in the system in the shape of messages of a certain length comprising an address and a pay-load. The messages are transferred on the highspeed links 10, 20, 34 and 46 unidirectionally in a stream in a certain direction, e.g. to the right in the figure. In an exchange unit with many subscribers redundancy is a prerequisite. A large proportion of the subscribers must not be rejected by occa-sional errors. It must also be possible to remove and add nodes in the system without disturbing ongoing traffic. Therefore, bidirectional loop structure is used to create this necessary redundancy. This redundancy is then achieved by the second central highspeed link 12 and the second, fourth and sixth peripheral highspeed links 22, 36 and 48. In normal operation, one of the uni-directional loops is used for all in-forma-tion transfer. The redundant loop is used in case of an interruption of the regular loop. In case of interruption, the node repairs the loop before and after the interrup-tion by using the opposite redundant loop. The relative order between the nodes is not changed. After an interruption the aim is to restore the two opposite loops so that the system can again withstand an interruption in an arbitrary place.

In each highspeed link, except the redundant links, a message stream is thus transferred, where some contain information and some are empty. An empty message here has a special structure known by all nodes in the exchange unit. Messages meant for one node is given to this node in dependence of the message address, and messages from said node meant for other nodes are fetched from the node when an empty message is found. When traffic in any PCM-channel arrives to the exchange unit in e.g. the sixth node 28, an address is added and a message is formed which is sent through the system to the receiving node, e.g. the thirteenth node 52. The high-speed links need not be optical fibre but coaxial cable works fine too. One can also imagine over-laying the messages on an ATM-link. The important thing is that it is a highspeed channel. The links can also be provided in the shape of parallel fibres. How the transfer is made in detail will be further explained below.

Figure 2:
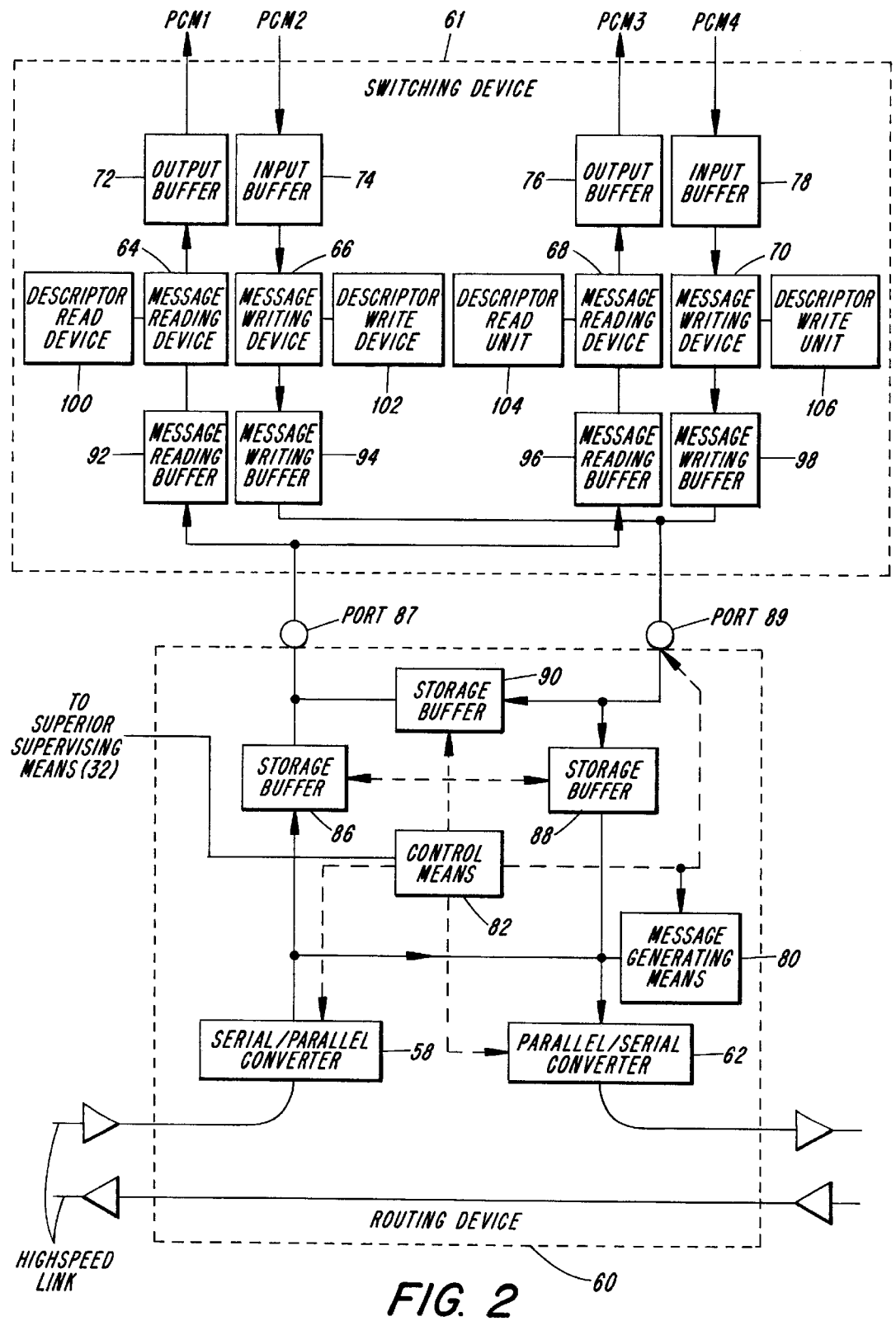
FIG. 2 shows a block diagram of a switching device and a routing device according to the invention.

FIG. 2 shows a block diagram of a node comprising a switching device 61 and a routing device 60 according to the invention, which switching device 61 thus is comprised in the exchange unit in FIG. 1. This node, however, is not a node comprised in any bridge, since the bridges lack switching devices and only comprise two interconnected routing devices. All switching devices 61 are substantially built according to the same principles, and therefore only one switching device needs to be described to explain the invention.

A peripheral highspeed link where traffic is transferred in the shape of a stream of messages is connected to a routing device 60. The routing device 60 comprises a serial/parallel converter 58, which converter comprises means for converting optical signals to electrical signals and means for converting a serial signal to a parallel sig-nal. The serial/parallel converter 58 is connected to the highspeed link to receive the stream of messages. The term "serial signal"here denotes a message transferred in serial form. The serial/parallel con-vertion can possibly be omitted, but it makes the transfer of signals through the node considerably faster. The serial/parallel converter 58 is connected to a parallel/serial converter 62, which is connected to the same highspeed link for feeding messages from the node and performs the opposite func-tion to the serial/parallel converter 58.

The redundant highspeed link is also comprised in the figure, which does not show how switching to this redundant loop is performed. How such switching can be per-formed is disclosed in many places in the literature within the field and will therefore not be further described here. The routing device 60 also comprises a first intermediate storing buffer 86 connected between the serial/parallel converter 58 and a first port 87, a second intermediate storing buffer 88 connected between a second port 89 and the parallel/serial converter 62, a third intermediate storing buffer 90 connected between the second 89 and first port 87, a message-generating means 80 connected to the parallel/serial converter 62 and a control means 82 connected to the serial/parallel converter 58, the second port 89, the message-generating means 80, the parallel/serial converter 62 and the intermediate storing buffers 86, 88 and 90. The serial/parallel converter 58 is also connected to the parallel/serial converter 62. The control means is preferably provided in the shape of a processor and also comprises a programmable circuit of Altera-type, e.g. EDM 10K10 and the intermediate storing buffers of FIFO-type (First In First Out). The control means 82 is also connected to the superior supervising means in the exchange unit via a connection 83 to enable communication therebetween. The connection 83 can be provided in many ways, for instance, by a direct connection between the superior supervising means and the control means 82. In the preferred embodiment all control means in each routing device in the exchange unit are, however, connected to the superior supervising means through a computer network, such as e.g. ethernet.

The first port 87 of the routing device 60 is connected to a first and a second message reading buffer 92 and 96 in the switching device 61. The second port is connected to a first and a second message writing buffer 94 and 98. The first message reading buffer 92 is connected to a first message reading device 64, said message reading device 64 being connected to a first output buffer 72, which in turn is connected to a first outgoing PCM-link PCM1 (Pulse Code Modulation). A first de-scriptor reading unit 100 is connected to the first message reading device 64. The first message writing buffer 94 is connected to a first message writing device 66, which in turn is connected to a first input buffer 74. The first input buffer 74 is connected to a first incoming PCM-link PCM2 therein. A first descriptor write unit 102 is connected to the first message writing device 66. The second message reading buffer 96 is connected to a second message reading device 68, which in turn is connec-ted to a second output buffer 76, The second output buffer 76 is connected to a second outgoing PCM-link PCM3. A second descriptor read unit 104 is connected to the second message reading device 68. The second message writing buffer 98 is connected to a second message writing device 70, which in turn is connected to a second input buffer 78. The second input buffer 78 is connected to a second incoming PCM-link PCM4, and a second descriptor write unit 106 is connected to the second message writing device 70.

The first incoming and outgoing PCM-links PCM 1, PCM2 constitute a first duplex pair and the second incoming and outgoing PCM-links PCM3, PCM4 constitute a second duplex pair so that duplex connections can be established, and thus the first message writing device 66 and the first message reading device 64 as well as the first descriptor read unit 100 and the first descriptor write unit 102 are associated with each other. Actually, these can be comprised in one and the same unit perform-ing the function of message reading and message writing and using one and the same descriptor unit. The message reading and writing devices are preferably pro-vided in the shape of programmable circuits of Altera-type. Buffers and descriptors are here preferably provided in the shape of RAM-memories. The same idea can, of course, be applied to the other message reading and writing devices with corresponding descriptor units.

The first message reading device 64 can also be connected to more output buffers for handling more PCM-links. The same idea can also be applied to the first message writing device 66 and, of course, to the other message reading/writing devices in the switching device. The switching device 61 can, of course, also comprise even more message reading and message writing devices, in the same way connected to the routing device 60.

The device shown in the figure is somewhat simplified since sending and receiving circuits are comprised. The device can also comprise sender and receiver buffers (SLIP-buffers). Such receiver buffers, usually some kind of shift registers, are used for receiving a complete frame, which frame is then placed in the corresponding input buffer. A sending buffer performs the opposite function for sending a frame from the output buffer. These further buffers are, however, not entirely necessary. These receiver and sender circuits and receiver buffers are well-known in the art and will not be shown and further explained. The function of the device will be described closer below.

Figure 3:
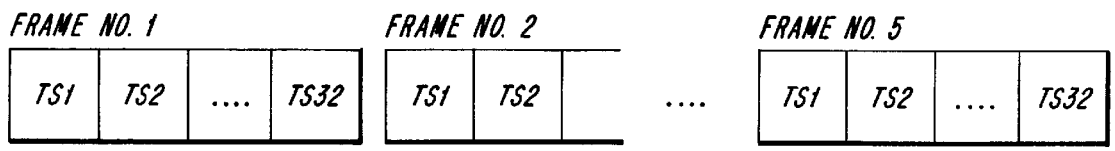
FIG. 3 shows two consecutive frames coming into the exchange unit on a telecommunication line, FIG. 4a schematically shows a message writing device connected to an input buffer and to a descriptor write unit to create a message.

FIG. 3 shows the structure of the incoming traffic on a PCM-link. Signals sent on a PCM-link are sent in consecutive frames, where a first frame, frame No. 1, a part of a second frame, frame No. 2, and a fifth frame, frame No. 5 are shown in the figure. Between these frames a third and a fourth frame are also sent, not shown in the figure. Many more frames than five are, of course, transferred on a PCM-link, but the preferred embodiment of the invention operates with five frames at a time. The frames are transferred with a certain transfer rate, which e.g. can be 2048 kbits/sec. Each frame is divided into a number of time slots TS1, TS2, Tsn, TS32, where a certain time slot normally is used for transfer of signals in one channel. Normally such a frame comprises 32 time slots, wherein each time slot then has a transfer rate of 64 kbits/sec. Other transfer rates with more or less time slots per frame are, of course, also possible. A channel between two different users can then take up all of such a time slot, a certain part of such a time slot, such as e.g. when compressed speech is transferred, or more than one time slot in several consecutive frames, such as in data transfer. A channel is normally established between two different end points in dependence of signalling performed between these two end points. Such signalling is performed under the control of the superior supervising means in the exchange unit. How this control can be performed is, however, well-known to the person skilled in the art and will therefore not be further described here.

Figure 4A:
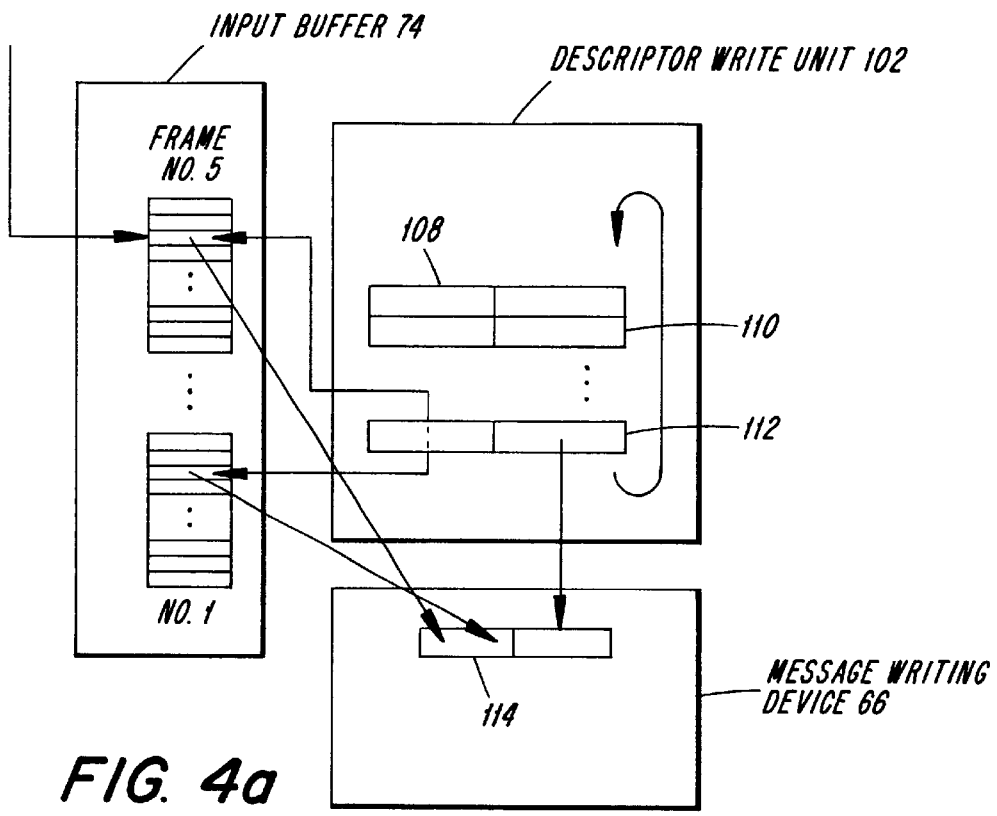
FIG. 4b shows a message reading device connected to a descriptor read unit and to an output buffer.

FIG. 4a shows the first input buffer 74, where five consecutive frames, frame No. 1, . . . frame No. 5 have been stored, however, only the first and fifth frames are shown. Furthermore, the first message writing device 66 is shown comprising a message 114 being formed and the first descriptor write unit 102 comprising descriptors 108, 110 and 112. The figure shows how these three different units are logically interconnected.

Figure 4B:
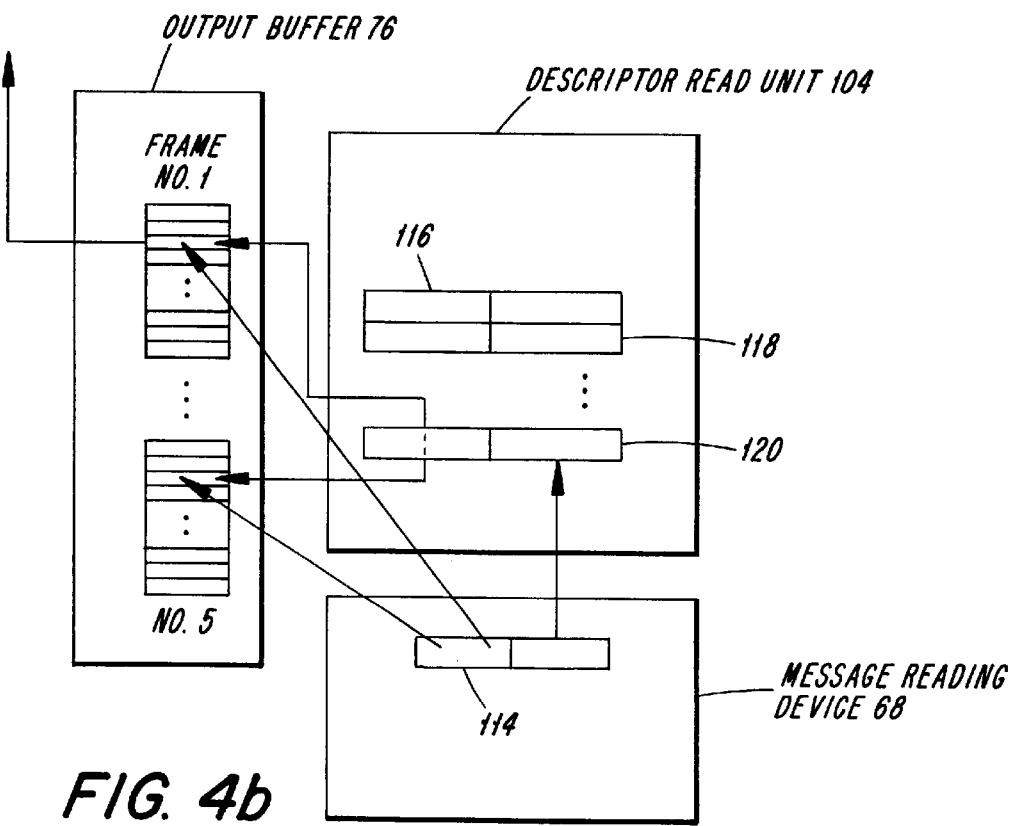
Figure 6A:
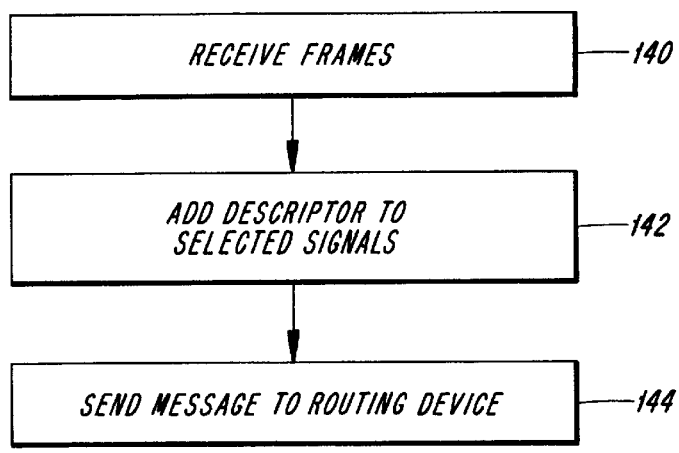
FIG. 6a shows a flow diagram of a method for providing a message.
Figure 6B:
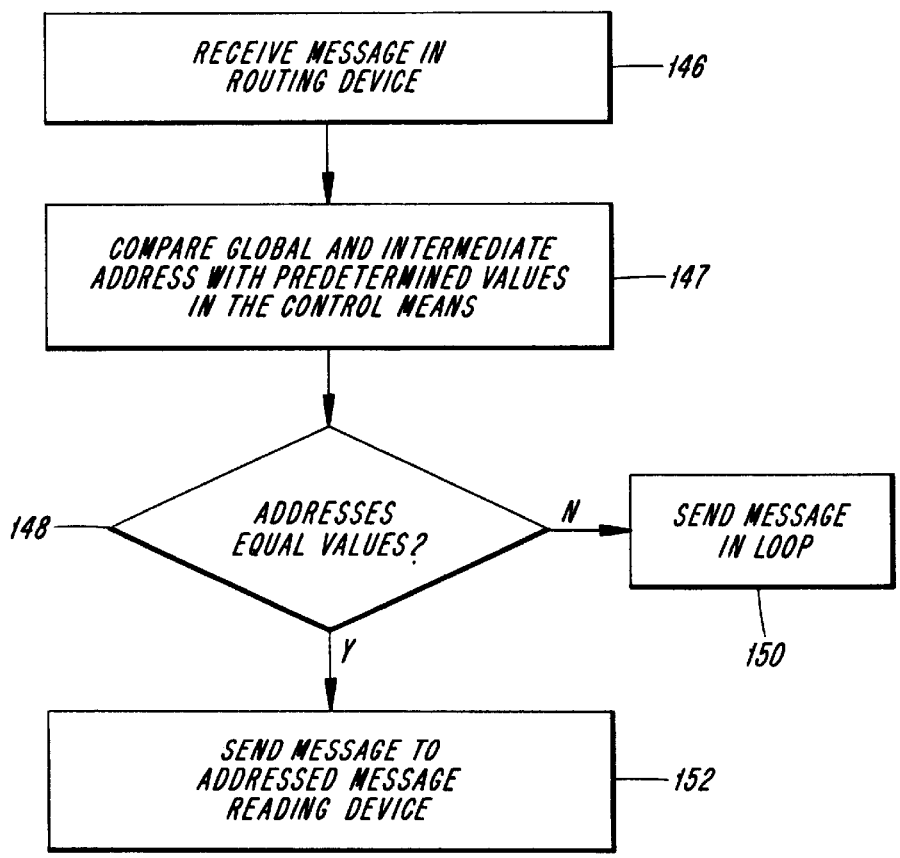
FIG. 6b shows a flow diagram of how a routing device works.
Figure 6C:
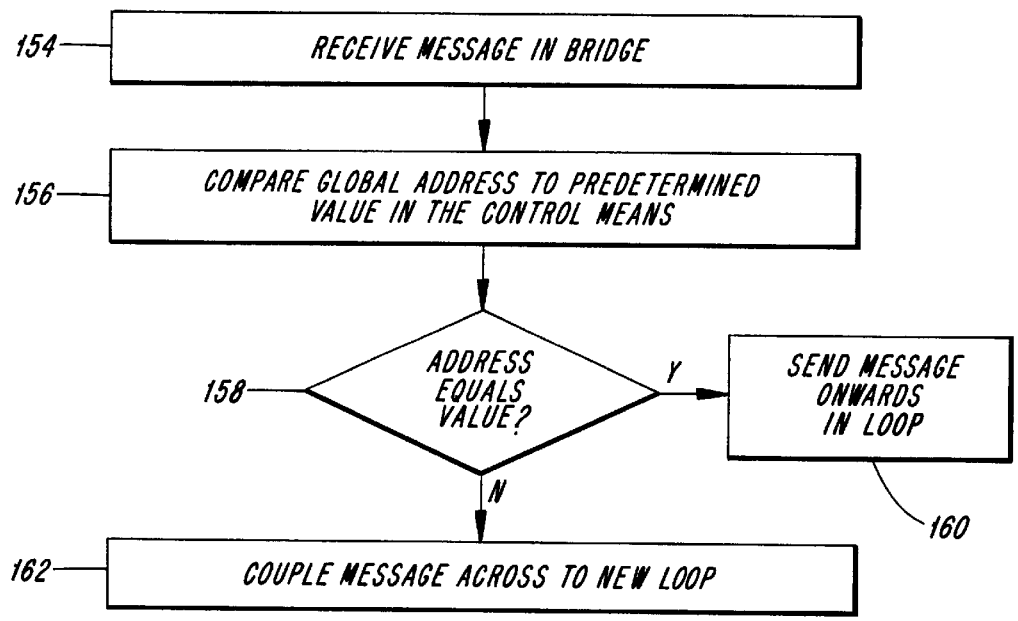
FIG. 6c shows a flow diagram of how a bridge works.
Figure 6D:
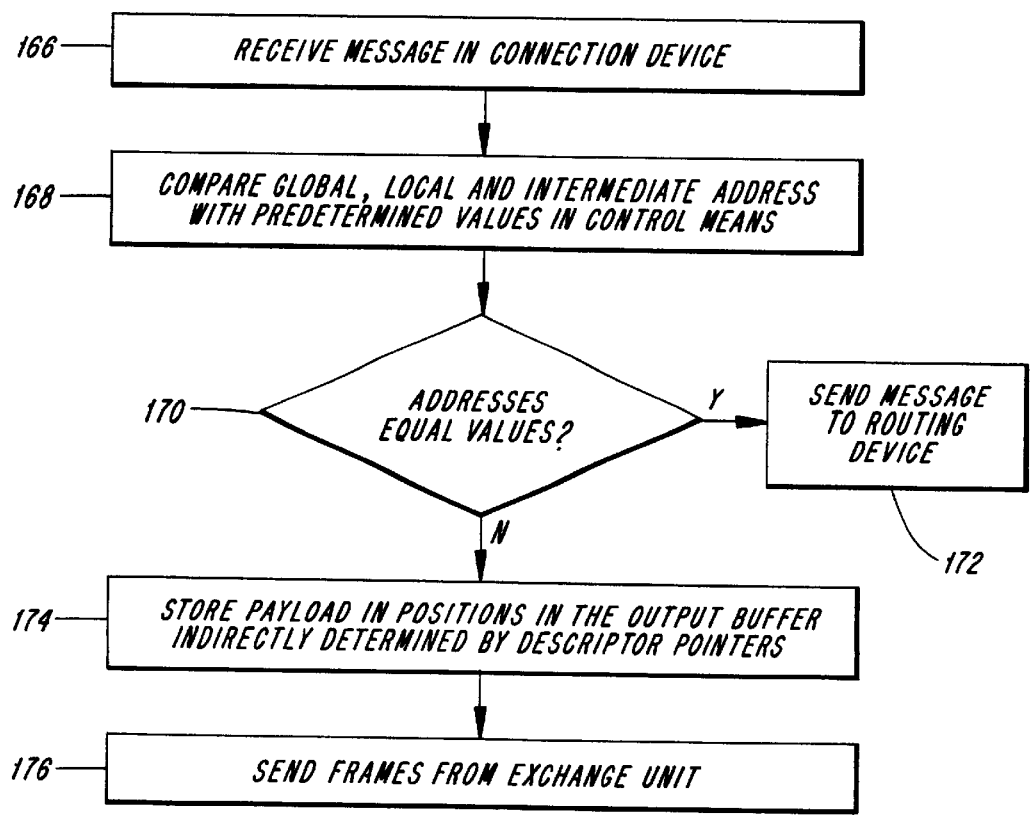
FIG. 6d shows a flow diagram of a method for receiving a message and sending its contents from the exchange unit.

FIG. 4b correspondingly shows how a second message reading device 68 comprising a received message 114 is interconnected to a first descriptor read unit 104 compris-ing descriptors 116, 118, 120 and a second output buffer 76 comprising two frames, frame No. 1 and frame No. 5 to be sent on an outgoing PCM-link from the exchange unit. This second output buffer also comprises five frames.

Figure 5:
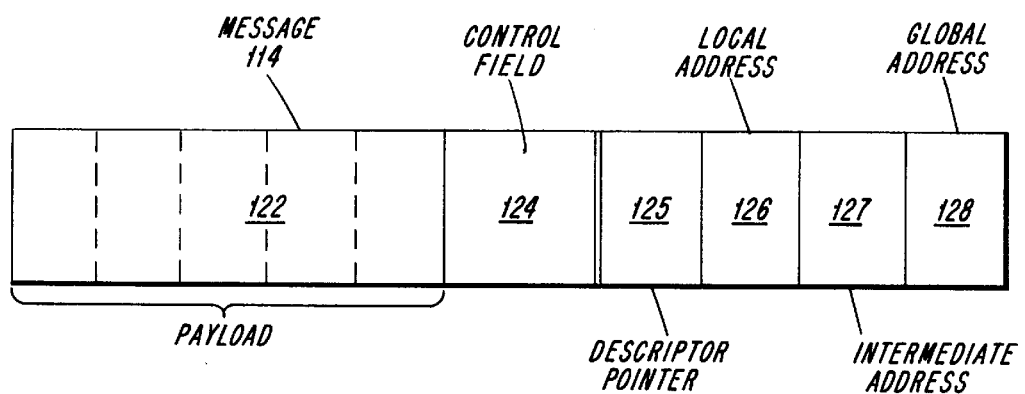
FIG. 5 shows the structure of a message.

FIG. 5 shows the structure of a message 114. A message 114 comprises a pay-load in the shape of the signals 122 received in a channel, a control field 124 comprising control information concerning the message and an address with the message destination. The address comprises a transport network address comprising a global address 128 and an intermediate address 127, where the global address 128 points to the loop in which the node to which the message is to be sent is located, and the intermediate address 127 points to the node to which the message is to be sent. The address also comprises a local address 126, stating to which message reading device in the node the message is to be sent, and a descriptor read unit connected to this mes-sage reading device. A descriptor pointer 125 is connected to the local address 126. The descriptor pointer 125 points to a descriptor in the descriptor read unit, said descriptor stating where the pay-load of the message is to be sent.

FIGS. 6a–d show flow diagrams describing the methods for forming, sending and receiving messages through the exchange unit.

The function of the exchange unit will now be described with reference to FIGS. 1–6.

With reference to FIGS. 3, 4a, 5 and 6a, the forming of messages according to the invention will now be described. The term "signal"in the following refers to the information received in a channel in a frame. It can thus constitute the contents of a whole time slot, part of a time slot and several time slots in a received frame. On a first incoming telecom-munication line, PCM2, five consecutive frames are received, frame No. 1 to frame No. 5, the contents of the time slots comprised in the frames being stored in the first input buffer 74, method step 140. The first message writing device 66 then cyclically reads a table in the first descriptor write unit 102, which table comprises a set of descriptors 108, 110 and 112, established in advance, each pointing to a signal in a time slot in each frame of the input buffer 74. Each such descriptor comprises a global address 128, an intermediate address 127, a local address 126, a descriptor pointer 125 and a control field 124. The descriptor also com-prises a buffer pointer pointing to the position in the first input buffer 74 where the signals transferred in a certain time slot in the five frames therein are stored. Each descriptor thus points to five positions in the input buffer where five signals from a time slot in five consecutive frames are stored. The first message writing device 66 then runs through each of the descriptors 108, 110, 112, fetches the signal pointed to by such a descriptor 112 and adds the address comprised in the descriptor to the signal to form a message 114, method step 142. All descriptors 108, 110, 112 have been established in advance by the superior supervising means comprised in the ex-change unit using signalling.

Thereby the signal in one of the incoming time slots in consecutive frames in a channel is a so-called signalling channel, and information in this channel is transferred from the first input buffer to the superior supervising means, which subsequently determines the descriptor address in dependence of this signalling. Thereafter the message writ-ing device 66 sends the message to the routing device 60 in the node, method step 144. Sending of the message is performed such that the message reading device 66 puts the message in the first message writ-ing buffer 94, which is a FIFO-type buffer, from which buffer the message is then sent to the port 89 of the routing device 60.

With reference to FIGS. 1, 2, 5 and 6b, the message 114 is then received in the rout-ing device 60, where this routing device is assumed to be located in the sixth node 28. The routing device 60 simultaneously receives several other message from the connected first peripheral highspeed link 20, method step 146. The routing device then compares the global address 128, the intermediate address 127 and the local address 126 with preset values, method step 147. The control means thus has preset values for the global address, i.e. the loop in which the node is located, the inter-mediate address, i.e. the node address or the address to the routing device and to the message reading device or devices con-nected to the routing device. If any of the pre-set values differs from the corresponding global address or intermedi-ate address in the received messages, method step 148, these messages are sent on the loop or the first peripheral high-speed link 20, method step 150. If the above addresses correspond to the values, method step 148, such messages are, however, sent to the message reading device in the node connected to the routing device, method step 152. In our example the message 114 is received on the port 89, the control means 82 analyzing the message address, and if it is meant for any other node than the own, it is placed in the second intermediate storing buffer 88, which is also of FIFO-type. If, however, the message would be meant for a message reading device in the same node, the message is placed in the third intermediate storing buffer 90, which is also of FIFO-type, and is fed to the message reading buffer, e.g. the second message reading buffer 96, associated with the message local address. All comparison taking place in the routing device between the different addresses substan-tially occurs as bit comparison so that each message can be routed for sending to a highspeed link or message reading device substantially at once. In this way table checks are avoided to see where a message is to be sent, and thereby the routing device is kept simple and cheap. All routing devices not comprised in any bridge work in the way mentioned above.

The bridges used in FIG. 1 to interconnect two highspeed links or loops are substantially routing devices which have been interconnected, and consequently they lack switching device. How such a bridge operates will now be described with reference to FIG. 1 and FIG. 6c.

When, for instance, the routing device in the fourth node 24 in the first bridge re-ceives a stream of messages, method step 154, its control means compares the global address in each message received from the first peripheral highspeed link or loop 20 with a predetermined value, method step 156, wherein the predetermined value is the same as the address of the loop 20. If a global address equals this value, method step 158, the message is forwarded in the loop 20, method step 160. If, however, the global address differs from the predetermined value, method step 158, the message is coupled to the routing device in the first node 14, the control means of which is arranged to feed this message to the first central highspeed link 10, method step 162. Naturally, the bridge works correspondingly in the reverse direction. This comparison also occurs as bit comparison and is therefore very fast and simple.

In our example the message is meant for a message reading device in another node and we here assume that the message is to be sent from the sixth node 28 to the fourteenth node 52. It can also be mentioned that the exchange unit is non-blocking, i.e. each local highspeed link is designed to be able to receive all messages sent from all nodes in the link and forward them to the central highspeed link without buffering the messages for very long, and the central high-speed link is designed to be able to receive all such messages from all peripheral highspeed links without corresponding buffering in the bridges. Thus, the central highspeed link obviously has a higher transfer rate than the local highspeed links, substantially equalling half of the sum of the transfer rates of the local highspeed links.

The routing device 60 in the sixth node 28 receives a serial message stream on the highspeed link 10, converts them to parallel form and analyzes the addresses of each message passing through the node. When it discovers a gap in the form of an empty message, it collects the message from the buffer 88, converts it to a serial message and feeds it into the stream instead of the empty message. If there are no messages in the buffer 88 to be sent out on the transport network, the empty message is forwarded to the parallel/ serial conver ter 62. If the routing device 60 receives a message from the highspeed link and the buffer 88 is empty, the control means 82 sees to it that an empty message is generated in the message generating means 80 and is fed to the stream in the position of the removed message addressed to the node. An empty message has a certain structure known by every routing device 60. A void can also arise due to a message having been fetched to the node from the stream. The message is thus forwarded to the highspeed link 20 and passes the seventh node 30 to arrive at the fourth node 24, in which node the global address is analyzed and the message is coupled to the central highspeed link 10 via the first node 14. In this central highspeed link 10 the message then passes the second node 16 and reaches the third node 18, where the message is coupled to the fifth peripheral highspeed link 46. Finally, the message reaches the four-teenth node 54 which fetches the message due to the global address, and its routing device 60 stores the message 114 in the first message storing buffer 86, which is also a FIFO-buffer, and then forwards the message in dependence of the local address to the second message reading buffer 96, for processing in the second message reading device 68.

How the message then is sent from the message reading device to a PCM-link will now be described with reference to FIGS. 3, 4b, 5 and 6d. The second message read-ing device 68 in the destination node receives said message 114 from the routing device 60 in the second message storing buffer 96, method step 166. The global, intermediate and local addresses 128,127 and 126 of the message are com-pared to values stored in advance, method step 168. If these addresses do not match the corresponding predetermined values, method step 170, the message 114 is sent back to the routing device 60, method step 172. If the addresses, however, match this value, method step 170, the pay-load 122 of the message is stored in positions in the output buffer 76 indirectly determined by the message descriptor pointer 125, method step 174. The descriptor pointer points to a descriptor 120 in the second descriptor read unit 104, said descriptor pointing to the locations in the second output buffer 76 in which the message pay-load is to be stored.

Thereafter the signals constituting the pay-load are sent in the time slot in which the channel has been established in five outgoing frames, method step 176. The descriptors 116,118,120 in the second descriptor read unit 104 have also been established in advance by the superior supervising means at said signalling. The comparison of whether a message has arrived correctly hereto occurs very quickly and as a bit comparison.

The invention described can be altered in many ways. In all cases the length of the message is fixed. However, the pay-load of a message can be filled completely or partly. In one alternative of the invention, an address is added to each signal filling a time slot or part of a time slot. The message thus created can then, according to one alternative, have an address directly pointing to the position in the corresponding output buffer from which it is to be sent. Such a solution means that one could avoid a descriptor read unit. The disadvantage of this arrangement is, however, that the address has to be larger and requires more space than when the address comprises a pointer to the descriptor read unit, and thus the transfer capacity of the entire system is deteriorated.

With a descriptor read unit connected to the message reading device one can simply comprise more than one signal in a message. The preferred number of signals is in the present case five, but both more or less are of course possible. The length of the messages can thus be varied, and the selection of message size is performed when initiating the exchange unit. This makes an exchange unit possible, which is flexible and can be adjusted to different requirements and different exchange environments.

Compared to the ATM-standard there is here no longer any buffering of messages which are to be transported onto the transport network, that could otherwise cause congestion. It is guaranteed that a message is coupled through the exchange unit within a certain time. Each single message is substantially processed in real time and handled almost immediately by the message reading devices to which they are addressed. Delay times can be well appreciated and calculated. The delay through the exchange unit substantially comprises four different subdelays, a first subdelay due to reception of a frame, 0 –1 frame period, a second subdelay for filling the signals into the frames in an input buffer, 1 frame period per signal in the message, a third subdelay due to transport to the output buffer, 1 frame period per signal in the message, and a fourth subdelay due to transmission in the output buffer 0 –1 frame period. For a message comprising five signals, a delay through the exchange unit of at the most 12 frame periods is thus obtained, a frame period being the time consumed for receiving a frame on a PCM-line.

Figure 7:
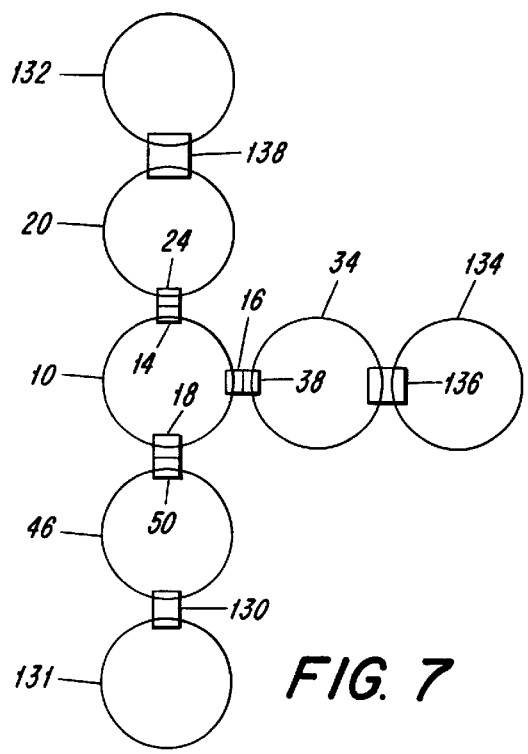
FIG. 7 shows an alternative embodiment of the exchange unit according to the invention.

In FIG. 7 an alternative exchange unit according to the invention is shown. This comprises, like before, the central highspeed link 10 where the first, second and third bridges 14, 24 and 16, 38 and 50, 18 and the first, third and fifth peripheral highspeed links 20, 34 and 46. In this case, however, the first, third and fifth peri-pheral highspeed links 20, 34 and 46 are connected each to a further peripheral highspeed link 132, 134 and 131 via a further bridge 138, 136 and 130 each. The first, third and fifth peripheral highspeed links can naturally each be connected to further loops, but here only three are shown for simplicity reasons. The messages sent in this structure will then have a different structure than the messages shown in FIG. 5. An additional address field is necessary. Assume the global address 128 and the intermediate address of the message in FIG. 5, are associated with a first central highspeed link and any of the first, third, fifth peripheral highspeed links, respectively, in the same way as before but that the local address 126 is associated with a node in any of the further peripheral highspeed links, a further intermediate address is then required between the intermediate address 127 and a local address 126 to address the further peripheral highspeed links. In this way a hierarchical structure is built for the exchange unit, and one address field is required in the message struc-ture for each such hierarchical level.The actual transmission, receiving and retrans-mission of messages will be performed in the same way as before. The redundant highspeed links have been omitted in this figure, but they can obviously be used in this exchange unit too.

What hitherto has been described is only sending messages from a message reading device to a message writing device. According to the invention, however, the control means in a routing device in a node can also send messages to other routing devices. The message is then generated by the control means. The messages generated by a control means in this way naturally have the same length as ordinary messages where traffic signals are transferred. If, however, the message is meant for another routing device, it comprises information pointing to the control means instead of the local address and descriptor pointer. These messages are stored in the intermediate storing buffer in the same way as other messages. With such a system it is, for instance, possible to convey control information from the superior supervising means to a control means in a node in the exchange located at a great physical distance from the rest of the exchange unit, such as, for instance, in another city. Control information can be transferred to this control means via another control means in the exchange unit physically located much closer to the superior supervising means. In this way, unnecessary extra costs for providing control lines between the superior supervising means and the node at a great distance can be avoided.

Addresses can arise in the transport network, which no node recognizes. Messages with such addresses can block a loop and bring it out of order. One way of remov-ing these faulty messages is to introduce the rule that no messages may pass more than n nodes in a loop, n being an integer. This is achieved by allocating at least one data bit in the control field for use as a counter, which is increased (or decreas-ed) one or several steps each time the message passes each node in a loop in the transport network. When this field has reached, exceeded or fallen below a certain predetermined value, the message is removed from the transport network. This can obviously be varied in a number of different ways.

Broadcasting can also be made possible in the device according to the invention, by letting the control field in the message comprise a broadcasting bit, and a routing device sending a broadcasting message on the transport network addressing this message to itself. The message is then forwarded to the highspeed links because the message has been classified as a broadcasting message. Each node except the node from which this message is sent, is then arranged to copy this message in depen-dence of the broadcasting bit, but is not allowed to remove the message from the transport network. When the broadcasting message thus reaches a node which has sent it, it is taken off the highspeed link without being copied since it has the same address as the node.

The invention is, of course, not limited to the embodiments described above and shown in the figures, but can be modified within the scope of the annexed claims.

What is claimed is:

1. A connection device for providing connections within an exchange unit, said exchange unit providing connections between at least a first telecommunication line (PCM2, PCM4) for incoming traffic and at least a second telecommunication line (PCM 1, PCM 3) for outgoing traffic, wherein signals are transmitted over said first and second telecommunication lines in time slots in consecutive frames (TS1, TS2, . . . , TS32), one traffic channel filling a particular, a part of a particular or more than a particular time slot in several consecutive frames, said connection device comprising;

a first input buffer for receiving and storing at least one frame from a corresponding telecommunication line for incoming traffic and a first output buffer for storing signals to be sent in at least one frame. characterized by;

a first message writing device (66, 70) connected to the first input buffer (74, 78);

a first descriptor write unit (102, 106) connected to said first message writing device, wherein said first descriptor write unit comprises descriptors (108, 110, 112) for signals received in the first input buffer, and wherein each descriptor is established in advance and comprises an address and wherein the first message writing device (66) is configured to form a plurality of messages by adding an address (126, 128) from a descriptor (112) to a payload for each traffic channel, wherein said payload comprises at least a part of one or a limited number of signals (122) received in said traffic channel and wherein said address points to a corresponding second message reading device (68) and to, at least indirectly, at least one time slot or a part of a time slot in at least one frame in which said payload is to be sent on said at least one second telecommunication line (PMC3); and wherein the plurality of messages are sent to the second message reading device, wherein the length of each message is variable.

2. The connection device according to claim 1 further comprising:

a second output buffer (76) connected between the second telecommunication line (PCM3) and the second message reading device (68);

a routing device (60) connected between the first message reading device (64) and the second message writing device in the connection device, wherein;

the routing device is arranged to receive the messages (114) sent from the first message writing device and to forward the messages to the second message reading device based on the addresses (126) of the messages; and the second message reading device is arranged to store each payload (122) received in the messages in at least one, at least indirectly determined by the address, position in the second output buffer for sending in at least one time slot or a part of a time slot in at least one frame via the second telecommunication line (PCM3).

3. The connection device according to claim 2 further comprising:

a second descriptor read unit (104) connected to the second message reading device (68), wherein the second message reading device is arranged to store each payload received (122) in the second output buffer (76) based on information (116, 118, 120) in the second descriptor read unit, established in advance, said information being pointed to by the address.

4. The connection device according to claim 1, wherein the first message writing device (66) comprises:

a corresponding first message reading device (64) connected to said first output buffer (72), wherein the combined first message reading and writing device is arranged to directly store signals received in the first input buffer (74) in said first output buffer, according to information in at least one descriptor in the first descriptor write unit (102), and wherein said signals are intended for a telecommunication line (PCM1) connected to the first output buffer.

5. A connection device for providing connections in an exchange unit, wherein said exchange unit provides a connection between at least one incoming telecommunication line for incoming traffic and at least one outgoing telecommunication line (PCM3) for outgoing traffic, wherein signals are transferred over telecommunication lines in time slots (TS1, TS2, . . . , TS32) in consecutive frames, wherein a traffic channel fills a particular, a part of a particular or more than a particular time slot in several consecutive frames, said connection device comprising:

at least one output buffer (76) for each outgoing telecommunication line for storing signals to be sent in at least one frame;

a message reading device (68) connected to said at least one output buffer, wherein the message reading device is arranged to receive at least one message (114) from a corresponding message writing device (66), said at least one message comprising a payload (122) and an address, wherein said payload comprises at least a part of one or a limited number is signals to be sent in a traffic channel in one or several consecutive frames, and wherein said address (126, 128) points to said message reading device; and store the payload (122) in at least one, at least indirectly determined by the address, position in said output buffer for sending in a traffic channel in at least one time slot or a part of a time slot in at least one frame via the at least one outgoing telecommunication line, wherein the length of the at least one message can be varied.

6. An exchange unit comprising:

a superior supervising means (32) for establishing and controlling telecommunication connections through the exchange unit;

at least one connection device (61), said connection device comprising;

at least one first input buffer (74) connected to a first telecommunication line (PCM2), over which signals are transferred in time slots (TS1, TS2, . . . , TS32), in consecutive frames, wherein a traffic channel takes up a particular, a part of a particular or more than a particular time slot in several consecutive frames, and wherein the first input buffer receives and stores at least one frame;

at least one second output buffer (76) connected to a second outgoing telecommunication line (PCM3) for storing signals to be sent, in said outgoing telecommunication line, in time slots in consecutive frames, wherein a traffic channel fills a particular, a part of a particular or more than a particular time slot in several consecutive frames;

a second message reading device (68) connected at least to the second output buffer (76);

a first message writing device (66) connected to at least the first input buffer (74) and a first descriptor write unit (102) connected to said first message writing device, wherein said first descriptor write unit comprises descriptors (108, 110, 112)

established in advance, for signals received in the first input buffer, and wherein each descriptor comprises an address (125, 126, 127, 128);

wherein the first message writing device is arranged to form a message by adding an address (126, 127, 128) from a descriptor (112) in the first descriptor write unit to a payload (122) for each traffic channel, wherein said payload comprises at least a part of one or a limited number of signals received in said traffic channel and said address points to the second message reading device (68) and to, at least indirectly (125), at least one time slot in at least one frame in which the payload is to be sent on the second telecommunication line (PCM3), and to send the message to the second message reading device (68) associated with the output buffer, wherein the length of the messages can be varied; and wherein the second message reading device is arranged to receive and store the payload (122) in at least one position in the second output buffer based at least indirectly on the address, said payload to be sent in at least one time slot or a part of a time slot in at least one frame via the second telecommunication line.

7. The exchange unit according to claim 6, wherein the first message writing device (66) is connected to a first routing device (60), which in turn is connected to a message reading device (64, 68), said routing device comprising:

means for receiving messages (58, 59);

means (86, 90) for sending said messages to said connected message reading device; and control means (82) for comparing the address of a received message with at least one predetermined value, said predetermined value being specific to said routing device; and wherein at least one of the received messages has a payload comprising at least a part of one or a limited number of signals (122) received in a traffic channel and an address comprising a local address (126), and wherein the control means is arranged to route said at least one of the received messages comprising a local address to a message reading device (68), connected to the routing device, to which said local address points.

8. The exchange unit according to claim 7, wherein the at least one second output buffer (76) and the second message reading device (68) are contained in the first connection device, and in that the second message reading device (68) is connected to the first message writing device (66) via said first routing device (60).

9. The exchange unit according to claim 8, wherein:

the first routing device (60) is connected to a transport network in the exchange unit via a means (62) for sending messages on the transport network each message comprises a transport network address (127, 128)

the control means (82) in the first routing device (61) is arranged to couple received messages to the transport network, if the transport network address in these messages does not correspond to said specific predetermined value, and to couple received messages comprising a local address, if the transport network address corresponds to the predetermined value, to a message reading device (68) connected to the routing device to which said local address points and the second output buffer (76) and the second message reading device (68) are contained in a second connection device, which is connected to the transport network via a second routing device (60) such that messages from the first message writing device meant for the second message reading device are sent to the first routing device, which is arranged to retransmit the messages to the second routing device via the transport network based on the transport network address.

10. The exchange unit according to claim 9, wherein the transport network comprises at least one ring shaped highspeed link (20, 34, 46) and all routing devices are arranged to send the messages (114) in a common direction in this ring.

11. The exchange unit according to claim 10, wherein:

the transport network is hierarchically built from several ring shaped highspeed links (10, 20, 34, 66; 10. 20, 34, 46, 131, 132, 134), which on the lowest hierarchical level (10, 20, 34, 46; 131, 132 134) are connected to a plurality of connection devices via corresponding routing devices;

a routing device and connection device pair forms a node (26, 28, 30, 40, 42, 44, 52, 54, 56) in the highspeed link on the lowest hierarchical level, and the highspeed links at the lowest hierarchical level are each only connected to a highspeed link (10; 131, 132, 134) on a higher hierarchical level via a bridge (14, 16, 24, 38, 50; 14, 16, 24, 38, 50, 130, 136, 138);

each bridge comprising:

means for receiving messages (58, 89) from a first one of the highspeed links;

means (62) for retransmitting the messages on the same highspeed link;

means (86, 62) for coupling messages to a second one of the highspeed links; and a control means (82) which is arranged to compare a global address (128) comprised in the transport network address (128) with at least one, specific to said bridge, predetermined value, said global address pointing to highspeed links, and to retransmit messages received in the bridge on the first highspeed link if the global address does not correspond to the predetermined value and otherwise to couple received messages to the second highspeed link.

12. The exchange unit according to claim 10, wherein each highspeed link (10, 20, 34, 46) in the transport network is associated with a redundant highspeed link (12, 22, 36, 48).

13. The exchange unit according to claim 6, wherein the first message writing device (66) comprises a corresponding first message reading device (64) connected to at least a first output buffer (72), and the combined first message reading and writing device is arranged to directly store signals received in the first input buffer (74) in said first output buffer, said signals according to information in the first descriptor write unit (102) being meant for a telecommunication line (PCM1) connected to the first output buffer.

14. The exchange unit according to claim 6, wherein the routing devices send and receive messages, and wherein all messages (114) comprise a control field (124).

15. The exchange unit according to claim 14, wherein the control means in a routing device is arranged to generate a broadcast message comprising a broadcast indication in the control field and the transport network address (127, 128) stating the routing device which generated the message, and to send the broadcast message on the transport network and remove a received broadcast message address with the own transport network address, the control means in all other routing devices being arranged to copy the broadcast message and send the original onwards in dependence of the broadcast indication.

16. The exchange unit according to claim 10, wherein each message comprises a control field (124), which can comprise an up or downwards adjustable error indication, wherein one or several routing devices connected to a highspeed link are arranged to up or downwards adjust the error indication each time is passes in the highspeed link, and that any routing device in the link is arranged to remove the message from the transport network if the error indication has obtained a predetermined value after up- or downwards adjustment.

17. A method for sending signals within an exchange unit from a first telecommunication line (PCM2) for incoming traffic to a second telecommunication line (PCM3) for outgoing traffic, over which telecommunication lines signals are transmitted in time slots (TS1, TS2, . . . , TS32) in consecutive frames, wherein a traffic channel on a telecommunication line fills up a particular, a part of a particular or more than a particular time slot in several consecutive frames the method comprising the steps of:

receiving at least one frame with signals from the first telecommunication line (140);

adding, for each traffic channel in a first message writing device (66), an address (126, 128) to a payload (122) to form a message (114), wherein said payload comprises at least a part of one or a limited number of signals received in at least one frame on the first telecommunication line, and said address point to a second message reading device (68) and to, at least indirectly, at least one time slot or a part of a time slot in at least one frame in which the payload is to be sent on the second outgoing telecommunication line (142); and sending the message through the exchange unit from the first message writing device to the second message reading device (144–166), wherein the length of the messages are variable.

18. The method according to claim 17, further comprising the steps of:

receiving the message (114) in the second message reading device (68, 166); and sending the payload (122) in one or several time slots in one or several consecutive frames on the second outgoing telecommunication line (PCM3, 176).

19. The method according to claim 18, wherein;

the message (114) comprises a local address (126); and the step of sending through the exchange unit (144–166) further comprises:

sending the message from the first message writing device (66) to a first routing device (60, 144), receiving the message in the first routing device (146), and coupling the message to a connected message reading device (68) to which said local address points (152).

20. The method according to claim 19, wherein;

the message further comprises a transport network address (127, 128); and the step of sending through the exchange unit (144–166) further comprises:

comparing, in the first routing device, the transport network address with at least one, specific to said routing device, predetermined value (147), wherein the step of coupling the message to a connected message reading device (150) only is executed if the transport network address equals the value (148), and in that otherwise the following steps are executed: sending the message on the transport network (150–162), receiving the message from the transport net-work in a second routing device (146), comparing the transport network address with at least one, specific to this routing device, predetermined value and sending the message to a message reading device pointed to by the local address if the transport network address equals the predetermined value (152) and otherwise retransmitting the message on the transport network (150–162).

21. The method according to claim 20, wherein the transport network address comprises a global address (128) and the step of sending the message (114) on the transport network (150–162) comprises;

sending a message to a first highspeed link (20, 150), receiving the message in a bridge (166), comparing in the bridge the global address with a predetermined value, specific to said bridge, and retransmitting the message in the first highspeed link (160) if the address equals the value (158), and otherwise coupling the message across to a second highspeed link (10, 162).

22. A method for receiving signals within an exchange unit for sending outgoing traffic on a telecommunication line (PCM3) over which telecommunication line signals are to be transmitted in time slots (TS1, TS2, . . . , TS32) in consecutive frames, wherein a traffic channel on a telecommunication line fills a particular, a part of a particular or more than a particular time slot in several consecutive frames, and comprising the steps of:

receiving at least one message (114) in a second message reading device (68), wherein the message comprises a payload (122) comprising at least a part of one or a limited number of signals to be sent in at least one or a part of a time slot in at least one frame on the out-going telecommunication line and an address (126, 128), wherein the address points to the second message reading device and, at least indirectly, the position in the frame/s within which the signals are to be sent on the second outgoing telecommunication line (166), and sending the payload in one or several consecutive frames on the outgoing telecommunication line (176), the length of the messages being variable.

23. A method for connecting signals in an exchange unit, the method comprising the steps of:

generating at least one message (114, 142), each message having a pay-load (122) and an address (125, 126, 127, 128) comprising a transport network address (127, 128), and at least one of the messages has a local address (126), comprised in the address, and a payload comprising at least a part of one or a limited number of signals received in a traffic channel filling a particular, a part of a particular or more than a particular time slot in several consecutive frames received on a first telecommunication line (PCM2, PCM4) connected to the exchange unit, coupling, in a first routing device (60), the message to a transport network if the message has a transport network address differing from an address assigned to the first routing device (148, 150), receiving, in a second routing device (60), the message from the transport network (146), retransmitting the message if the transport network address differs from an address assigned to the second routing device (148, 150), otherwise keeping the message in the routing device;

retransmitting the message, if it has a local address, to a message reading device (68; 148, 150) determined by the local address, and sending the pay-load in one or several consecutive frames on a second telecommunication line (176) outgoing from the exchange unit.

* * * * *